United States Patent [19]

Hall

[11] 3,747,658
[45] July 24, 1973

[54] FLEXIBLE SECTIONAL WHEEL
[76] Inventor: Gordon R. Hall, P.O. Box 496, Listowel, Ontario, Canada
[22] Filed: Nov. 2, 1971
[21] Appl. No.: 194,938

[52] U.S. Cl............... 152/97, 152/14, 152/262
[51] Int. Cl............................................. B60b 9/06
[58] Field of Search................... 152/14, 97, 104, 152/105, 111, 262, 269

[56] References Cited
UNITED STATES PATENTS
| | | | |
|---|---|---|---|
| 1,308,633 | 7/1919 | Horne | 152/262 |
| 1,039,594 | 9/1912 | Rossignol | 152/262 |
| 1,108,749 | 8/1914 | Harlan | 152/14 |
| 1,303,366 | 5/1919 | Murdock | 152/262 |
| 1,595,010 | 8/1926 | Lindholm | 152/262 |

Primary Examiner—Drayton E. Hoffman
Attorney—Clarence A. O'Brien and Harvey B. Jacobson

[57] ABSTRACT

A central body portion is provided for mounting on an axle and a set of at least three arcuate peripheral portions are arranged in spaced end to end relation about the central body portion a spaced distance outwardly of the outer periphery thereof. Coil springs are provided and connected between each pair of adjacent ends of the peripheral portions and the opposing portions of the center body portion whereby the arcuate peripheral portions are biased away from but may move toward the central body portion. Also, limit structure is connected between the mid portions of each of the peripheral portions and the opposing portions of the central body limiting movement of the peripheral portions outwardly from the body and the adjacent ends of the arcuate peripheral portions are connected together for limited relative lateral movement.

11 Claims, 8 Drawing Figures

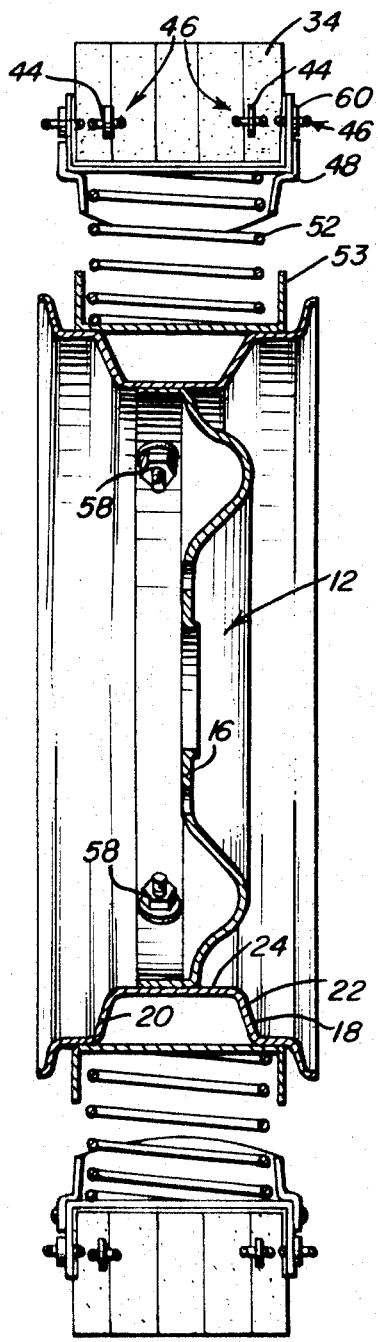
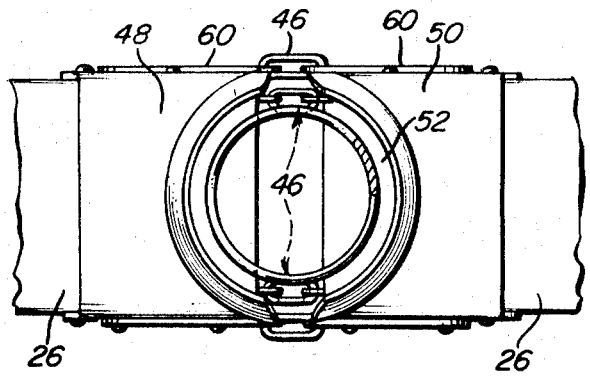
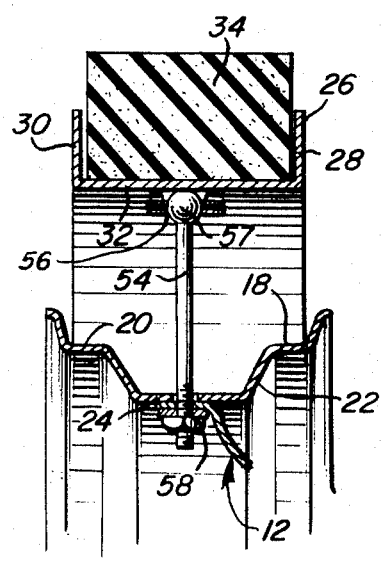
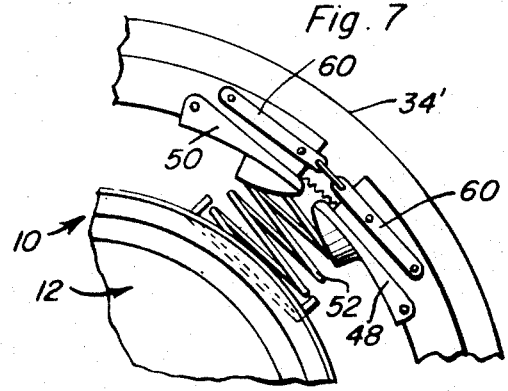

FLEXIBLE SECTIONAL WHEEL

The wheel of the instant invention has been primarily designed to provide a wheel for vehicles including road shock absorbing structure similar to that afforded by pneumatic tire but of a type that is not inflated and thereby cannot be rendered inoperable by the normal road hazards which cause punctures of pneumatic tires. Further, the sectional wheel is constructed in a manner whereby greater traction than that afforded by conventional pneumatic tire will be inherent and the load capacity of the wheel may be varied, as desired, with little modification of the wheel.

The main object of this invention is to provide a vehicle wheel to be used on highway vehicles, farm and other vehicles as well as aircraft and which will not be subject to disablement by punctures.

Another object of this invention is to provide a wheel which will function in a manner of a pneumatic wheel or tire but which will be capable of affording greater traction than a pneumatic tire.

Still another object of this invention is to provide a vehicle wheel which may be readily modified to vary its load capacity.

A final object of this invention to be specifically enumerated herein is to provide a flexible wheel which will conform to conventional forms of manufacture, be of simple construction and easy to use so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

FIG. 3 is an enlarged sectional view taken substantially upon the plane indicated by the section line 3—3 of FIG. 1;

FIG. 4 is an enlarged fragmentary sectional view taken substantially upon the plane indicated by the section line 4—4 of FIG. 1, FIG. 5 is an enlarged fragmentary sectional view taken substantially upon the plane indicated by section line 5—5 of FIG. 1;

FIG. 7 is a fragmentary side elevational view illustrating a modified form of wheel.

Figure 1:
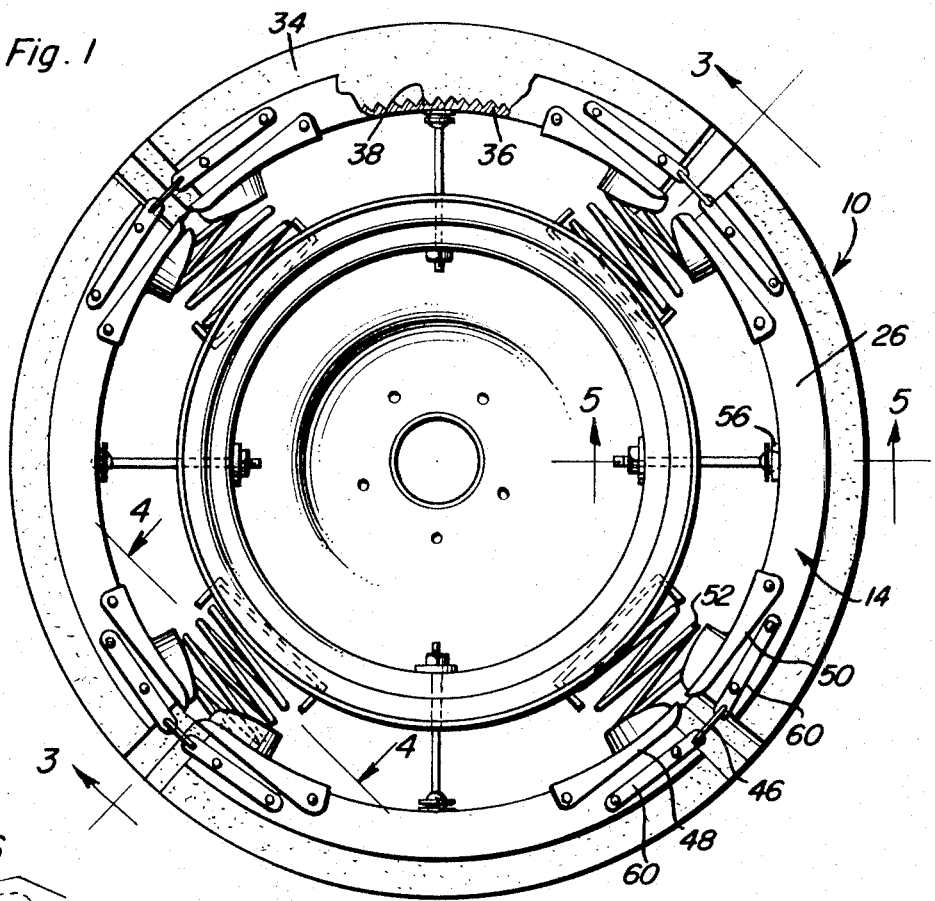
FIG. 1 is a side elevational view of the sectional wheel of the instant invention with a portion of one of the arcuate peripheral portions or segments broken away and illustrated in vertical section.

Referring now more specifically to the drawings the numeral 10 generally designates the wheel of the instant invention which includes a center body portion referred to in general by the reference numeral 12 and a plurality of outer peripherally spaced arcuate tread segments referred to in general by the reference numerals 14. The body 12 is quite similar to a conventional automotive wheel in that it includes a center apertured portion 16 for mounting on a vehicle brake drum and an outer channel shaped peripheral portion 18 including a pair of opposite end annular flange assemblies 20 and 22 and a central cylindrical connecting portion 24.

Each of the tread segments comprises an arcuate channel member 26 including opposite side and axially spaced annular flanges 28 and 30 connected by means of a cylindrical bight portion 32 connected between the inner peripheral edges of the annular flanges 28 and 30. Further, each of the channel members 26 includes an arcuate rubber or other resilient material tread insert 34 secured within the channel member 26 in any convenient manner and including a corrugated inner peripheral surface 36 mated with the corrugated outer surface portions 38 of the bight portion 32.

Figure 6:
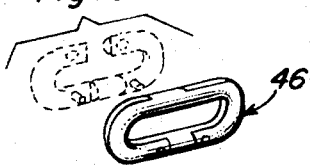
FIG. 6 is a perspective view of one of the separable connecting links utilized to secure the adjacent ends of the outer peripheral arcuate sections of the wheel together.
Figure 2:
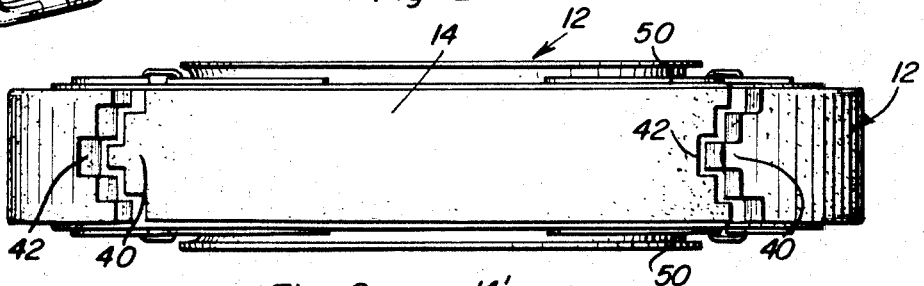
FIG. 2 is a top view of the vehicle wheel.

The adjacent ends of the tread inserts 34 include loosely telescoped stepped projections 40 and recesses 42 and have pairs of opposite side anchor eyes 44 imbedded therein with an openable closed connecting link such as that referred to by the reference numeral 46 and illustrated in FIG. 6 of the drawings secured between each pair of corresponding anchor eyes 44 thereby securing adjacent ends of the tread inserts 34 together.

The inner peripheral portions of the adjacent ends of the tread segments 14 include spring seat brackets 48 and 50 secured thereto and the outer end of a radial compression spring 52 is seated and anchored in each pair of brackets 48 and 50. The inner ends of the springs 52 are seated in brackets 53 provided therefor and secured across the flange assemblies 20 and 22 outwardly of the connecting portion 24. The springs 52 are resilient but quite stiff and they accordingly support the tread segments 14 for guided radial movement relative to the body 12. The mid portion of each tread segment 14 includes a ball socket construction 56 and the spherical head 57 on the outer end of a radial tension rod 54 is secured in each ball socket construction 56 with the radial inner most end of each tension rod 54 secured through the connecting portion 24 by means of a suitable fastener 58. Of course, the tension rods 54 limit radial outward movement of the tread segments 14 under the biasing action of the springs 52.

The flanges 28 and 40 of each tread segment 14 further include opposite end anchor straps 60 which project endwise outwardly of the corresponding channel member 26 and the adjacent ends of each pair of corresponding straps 60 are connected together by one of the connecting links 46. Further, the outer periphery of each tread insert 34 may be provided with any suitable tread pattern.

As the wheel 10 rolls it will be evident that any road irregularity will be at least partially absorbed by radial inward and outward movement of the tread segments 14. Further, as the lower most tread segment supports substantially all of the load on the wheel 10, as each next tread segment moves toward contact with the supporting surface of the wheel its leading end will be projecting slightly further outwardly than the trailing end of the tread segment in contact with the road and thus present a traction face for better traction in mud, sand and snow.

With attention now invited more specifically to FIG. 7, it may be seen that the wheel 10 may be provided with a modified form of tread insert 34' which is continuous about the periphery of the wheel 10 and which therefore does away with the necessity for the anchor eyes 44 and the connecting links 46 used to connect the anchor eyes 44 together in the embodiment illustrated in FIGS. 1 – 6. Of course, the tread insert 34' is constructed of resilient material and therefore enables relative shifting between the adjacent ends of the tread segments 14.

Figure 8:
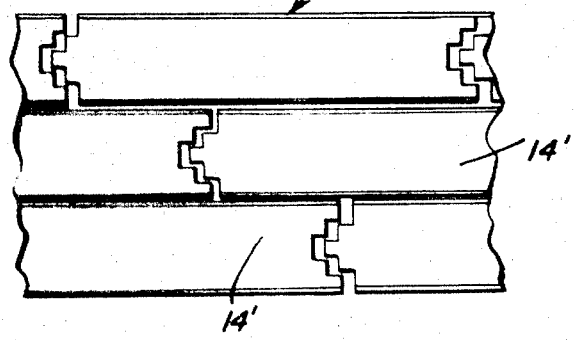
FIG. 8 is a fragmentary top plan view illustrating still another modified form of wheel.

With attention now invited to FIG. 8 of the drawings, it may be seen that the wheel 10 may be further advanced by the utilization of a plurality of sets of circumferentially spaced tread segments 14' spaced axially of the wheel 10 and with the tread segments 14' of each set of segments staggered relatively to the segments 14' of the other sets of segments. Finally, it is also envisioned that in lieu of the anchor eyes 44, the wheel 10 could include link chain sections extending completely through the length of each tread segment 14 with connecting links 46 being utilized to connect the adjacent ends of such link chain segments.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A flexible sectional wheel including a center portion adapted to be mounted on an axle, a set of arcuate peripheral portions arranged in spaced end to end relation and extending about and spaced radially outwardly of said center portion, means connected between each pair of adjacent ends of said peripheral portions and said center portion supporting said adjacent ends for guided generally radial movement toward and away from said center portion and yieldingly biasing said adjacent ends away from said center portion, means connected between said arcuate peripheral portions and said center portion limiting outward movement of said arcuate peripheral portions, and means connecting the adjacent ends of said arcuate portions together for limited relative movement in substantially all directions.

2. The combination of claim 1 wherein said means connected between said peripheral portions and said center portion limiting outward movement of said arcuate peripheral portions comprises a movement limiting assembly anchored to the longitudinal mid portion of each of said arcuate peripheral portions.

3. The combination of claim 1 wherein said means connected between each pair of adjacent ends of said peripheral portions and said center portion comprises an open convolution large diameter and stiff compression spring having one end thereof anchored to a corresponding adjacent end of the related peripheral portions and the other end anchored relative to said center portion.

4. The combination of claim 1 wherein said arcuate peripheral portions comprise arcuate channel members having elongated arcuate tread inserts constructed of resilient material seated therein.

5. The combination of claim 4 wherein said means connected between said adjacent ends of said arcuate peripheral portions for limited relative movement of the latter in all directions include articulated link means connected between the adjacent ends of said channel members and also the adjacent ends of said tread inserts.

6. The combination of claim 4 wherein said means connected between the adjacent ends of said arcuate peripheral portions for limiting relative movement of the latter in all directions comprise articulated link means connected between adjacent ends of said channel members, and integral portions of said tread inserts extending between said adjacent ends of said peripheral portions whereby a continuous peripheral tread is provided.

7. The combination of claim 1 wherein said wheel includes a plurality of axially spaced sets of circumferentially spaced arcuate peripheral portions, the peripheral portions of each set of peripheral portions being peripherally staggered relative to the peripheral portions of adjacent sets.

8. The combination of claim 1 wherein said means connected between said peripheral portions and said center portion limiting outward movement of said arcuate peripheral portions comprises a movement limiting assembly anchored to the longitudinal mid portion of each of said arcuate peripheral portions, wherein said means connected between each pair of adjacent ends of said peripheral portions and said center portion comprises an open convolution large diameter and stiff compression spring having one end thereof anchored to a corresponding adjacent end of the related peripheral portions and the other end anchored relative to said center portion.

9. The combination of claim 8 wherein said arcuate peripheral portions comprise arcuate channel members having elongated arcuate tread inserts constructed of resilient material seated therein.

10. A flexible sectional wheel including a center portion adapted to be mounted on an axle, a set of arcuate peripheral portions arranged in spaced end to end relation and extending about and spaced radially outwardly of said center portion, means connected between each pair of adjacent ends of said peripheral portions and said center portion supporting said adjacent ends for guided generally radial movement toward and away from said center portion and yieldingly biasing said adjacent ends away from said center portion, means connected between said arcuate peripheral portions and said center portion limiting outward movement of said arcuate peripheral portions, and means connecting the adjacent ends of said arcuate portions together for limited angular displacement relative to each other about axes extending transversely of said adjacent ends.

11. The combination of claim 10 wherein said means connected between said peripheral portions and said center portion limiting outward movement of said arcuate peripheral portions comprises a movement limiting assembly anchored to the longitudinal mid portion of each of said arcuate peripheral portions.

* * * * *